UNITED STATES PATENT OFFICE.

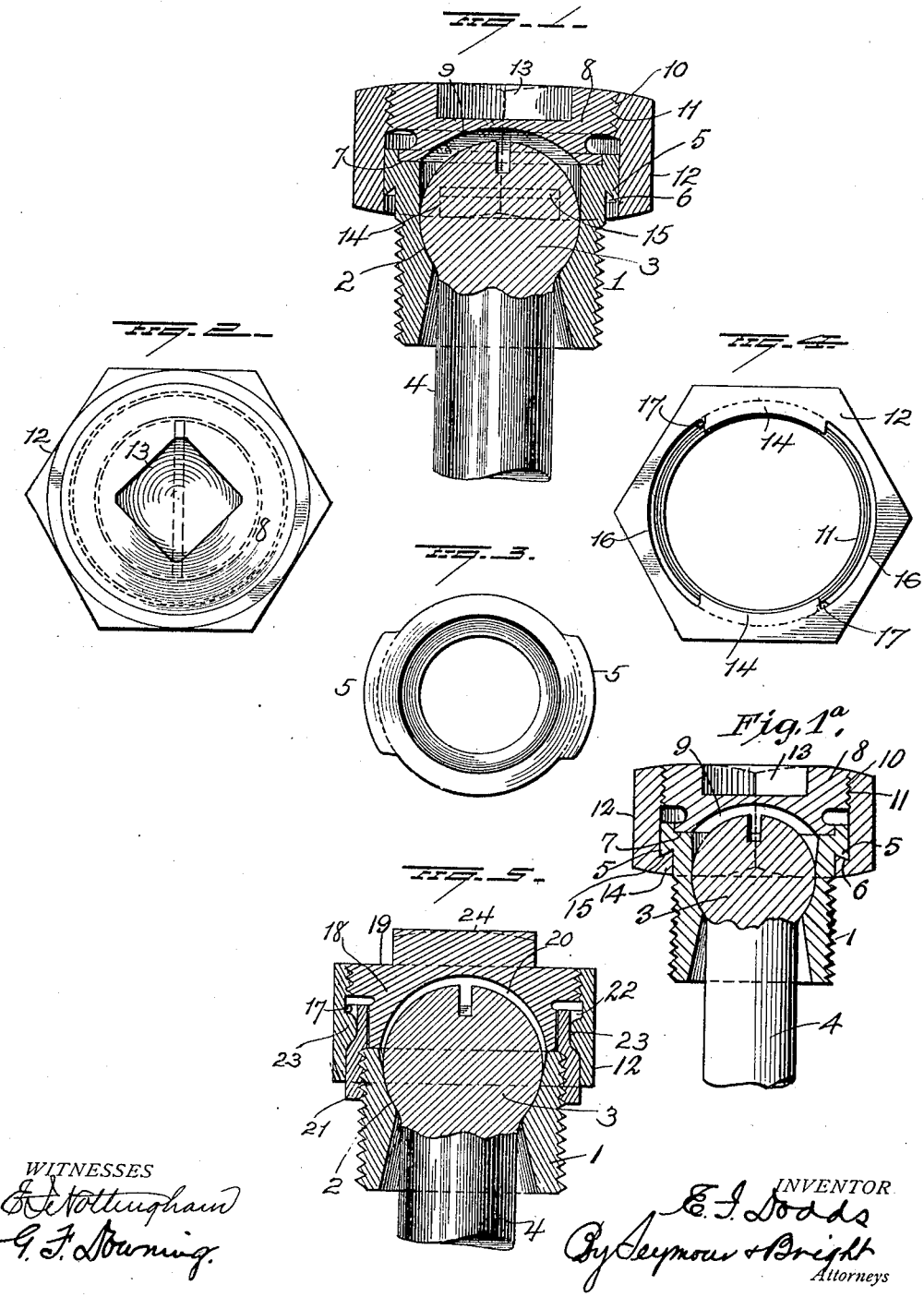

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT STRUCTURE.

1,298,308.  Specification of Letters Patent.  Patented Mar. 25, 1919.

Application filed April 26, 1918. Serial No. 230,913.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Stay-Bolt Structures; and I do hereby declare the following to be a full, clear, and exact description of the invention, such as will enable others skilled in the art to which it appertains to make and use the same.

This invention relates to improvements in staybolt structures for boilers and more particularly to an improved closure for the bearing sleeve thereof,—the object of the invention being to provide a simple closure which can be easily and quickly removed to expose the head of the bolt for testing purposes, and which can be as quickly replaced and operates normally to tightly close the outer end of the bearing sleeve.

With this and other objects in view, the invention consists in certain novel features of construction and combinations of parts as hereinafter set forth and pointed out in the claims.

In the accompanying drawings; Figure 1 is a sectional view of a staybolt structure showing an embodiment of my invention; Fig. 1ª is a sectional view taken at right angles to Fig. 1; Fig. 2 is a plan view; Fig. 3 is an end view of the bearing sleeve; Fig. 4 is a bottom plan view of the locking member, and Fig. 5 is a sectional view showing a modification.

1 represents a bearing sleeve adapted for connection with a boiler sheet and provided interiorly with a curved face 2 which serves as a bearing for the rounded or spherical head 3 of a staybolt 4.

The bearing sleeve is provided at its outer end portion with a plurality of lugs 5 having beveled rear edges 6, and the outer end of said bearing sleeve is made with a seat 7 for the edge portion of a cap or closure 8 preferably having a concave under portion 9 of such dimensions and configuration as to provide for suitable clearance for the head of the bolt.

The cap or closure is made circular in form and provided with external screwthreads, as indicated at 10 to receive the internally threaded portion 11 of a locking member 12, and said cap or closure may be made with an angular socket 13 to receive a wrench.

The annular locking member 12 is made in the form of a sleeve, the inner or rear portion of which is made of sufficient diameter to encircle the outer end of the bearing sleeve and the lugs 5 thereon and the outer face of said sleeve 12 may be made angular to receive a wrench. The inner or rear end of the locking member or sleeve 12 is provided with inwardly projecting flanges 14 having beveled outer faces 15 to engage the beveled rear faces of the lugs 5, and said flanges 14 are spaced apart, as indicated at 16, to permit them to pass inwardly beyond the lugs 5 when the sleeve or locking member 12 is being applied to the outer end of the bearing sleeve 1. One or more stops, such as indicated at 17 will be located in the sleeve or locking member to limit the extent to which the latter may be turned.

When the parts shall have been assembled as above described and as shown in Fig. 1, the operator will, with the use of a suitable wrench inserted into the angular socket of the cap or closure, turn the same and the locking member 12 so as to cause the beveled flanges of the latter to become disposed behind the beveled lugs 5 on the bearing sleeve. After the stop (or stops) 17 engages one (or more) of the lugs 5, further turning of the cap or closure will (by reason of the threaded connection with the sleeve 12) cause the cap or closure to be tightly clamped to its seat and the beveled flanges of the sleeve 12 to tightly bind against the beveled lugs 5 on the bearing sleeve 1.

It is apparent that by a reversal of the operation above described, the cap or closure will become unlocked and may be removed with the sleeve or locking member 12 to expose the head of the bolt for testing purposes. These parts may be as quickly replaced and locked or clamped in place to tightly close the outer end of the bearing sleeve.

In the form of the invention shown in Fig. 5, a cap or closure 18 is employed having an annular flange 19 threaded on its periphery to receive the internally threaded portion of the locking sleeve, and said cap is made with a concave portion 20 which enters a bearing sleeve extension 21 threaded on the body of the bearing sleeve,—said bearing sleeve extension being provided with lugs or flanges 22 with which, projections 23 in the sleeve or locking member 12 coöperate. Stops 17 are also provided as in the construction shown in Fig. 1. In the form of the invention shown in Fig. 5, the cap or closure may be provided with an angular head 24 to receive a wrench.

Having fully described my invention, what I claim as new and desire to secure by Letters-Patent, is:—

1. In a staybolt structure, the combination with a bearing sleeve having laterally projecting lugs at its outer end portion, of a cap or closure to seat against the bearing sleeve and adapted to receive a wrench, said cap or closure having a threaded peripheral portion, a locking sleeve threaded on said cap or closure and receiving the outer end portion of the bearing sleeve, and provided with inwardly projecting flanges at its rear end to engage the lugs on the bearing sleeve, and stop means in said locking sleeve to limit the turning of said locking sleeve relatively to the bearing sleeve.

2. In a staybolt structure, the combination with a bearing sleeve having external lateral lugs at its outer end, said lugs having rear beveled faces, of a cap to seat against the bearing sleeve, said cap having a threaded peripheral portion, a locking sleeve threaded on said cap and having a part to encircle the outer end position of the bearing sleeve and provided with inwardly projecting flanges beveled on their forward faces to engage the beveled rear faces of the lugs on the bearing sleeve, and stop means in the bearing sleeve for limiting the turning of the locking sleeve relatively to said bearing sleeve.

In testimony whereof, I have signed this specification in the presence of two subscribing witnesses.

ETHAN I. DODDS.

Witnesses:
S. G. NOTTINGHAM,
R. S. FERGUSON.

Copies of this patent may be obtained for five cents each, by addressing the "Commissioner of Patents, Washington, D. C."